(12) United States Patent
Suzuki et al.

(10) Patent No.: US 8,879,627 B2
(45) Date of Patent: Nov. 4, 2014

(54) MOVING IMAGE ENCODING APPARATUS, MOVING IMAGE DECODING APPARATUS, MOVING IMAGE ENCODING METHOD, MOVING IMAGE DECODING METHOD, MOVING IMAGE ENCODING PROGRAM, MOVING IMAGE DECODING PROGRAM, AND MOVING IMAGE ENCODING/ DECODING SYSTEM

(75) Inventors: Yoshinori Suzuki, Saitama (JP);
Choong Seng Boon, Yokohama (JP);
Thiow Keng Tan, Singapore (SG)

(73) Assignee: NTT DoCoMo, Inc., Tokyo (JP)

( * ) Notice: Subject to any disclaimer, the term of this patent is extended or adjusted under 35 U.S.C. 154(b) by 829 days.

(21) Appl. No.: 13/077,287

(22) Filed: Mar. 31, 2011

(65) Prior Publication Data
US 2011/0249738 A1 Oct. 13, 2011

Related U.S. Application Data

(63) Continuation of application No. PCT/JP2009/065649, filed on Sep. 8, 2009.

(30) Foreign Application Priority Data

Oct. 1, 2008 (JP) ................................. 2008-256601

(51) Int. Cl.
*H04B 1/66* (2006.01)
*H04N 19/184* (2014.01)
*H04N 19/136* (2014.01)
*H04N 7/12* (2006.01)

(52) U.S. Cl.
CPC ....... *H04N 7/26287* (2013.01); *H04N 7/26148* (2013.01)

USPC ................................. 375/240.12; 375/240.01

(58) Field of Classification Search
CPC .. H04N 7/26148; H04N 7/26287; H04N 7/32
USPC ........................................ 375/240.01–240.24
See application file for complete search history.

(56) References Cited

U.S. PATENT DOCUMENTS

| 6,222,886 B1 | 4/2001 | Yogeshwar |
| 6,243,421 B1 | 6/2001 | Nakajima et al. |

(Continued)

FOREIGN PATENT DOCUMENTS

| EP | 2003897 A2 | 12/2008 |
| JP | 09-247673 A | 9/1997 |

(Continued)

OTHER PUBLICATIONS

International Preliminary Report on Patentability for International Application No. PCT/JP2009/065649, dated May 10, 2011, 4 pages.

(Continued)

*Primary Examiner* — Behrooz Senfi
(74) *Attorney, Agent, or Firm* — Brinks Gilson & Lione

(57) ABSTRACT

In order to improve the encoding efficiency while avoiding an increase in the size or memory band of a frame memory and having adaptability in the encoding/decoding processing of a moving picture, a bit length extension converter converts a target picture having a bit length N into an extended target picture having a bit length M, a compressor encodes the converted picture, and an expander restores the encoded picture. Then, a bit length reduction converter converts the picture into a reproduction picture having a bit length L smaller than the bit length M, and this reproduction picture is stored in a frame memory as a reference picture.

19 Claims, 11 Drawing Sheets

(56) References Cited

U.S. PATENT DOCUMENTS

| | | | |
|---|---|---|---|
| 6,560,285 B1 | 5/2003 | Reitmeier et al. | |
| 2003/0194009 A1 | 10/2003 | Srinivasan | |
| 2008/0170626 A1* | 7/2008 | Sung et al. | 375/240.24 |
| 2009/0087111 A1 | 4/2009 | Noda et al. | |
| 2010/0027617 A1* | 2/2010 | Lee et al. | 375/240.01 |

FOREIGN PATENT DOCUMENTS

| | | |
|---|---|---|
| JP | 2002-542739 A | 12/2002 |
| JP | 2003-333603 A | 11/2003 |
| WO | WO 2007/114368 A1 | 10/2007 |

OTHER PUBLICATIONS

Chujoh, Takeshi et al., "Internal bit depth increase except frame memory," ITU-Telecommunications Standardization Sector, Study Group 16, Question 6, Video Coding Experts Group (VCEG), VCEG-AF07, Apr. 19, 2007, XP030003528, 4 pages.

Extended European Search Report for European Application No. 09817624.1, dated Apr. 11, 2013, 8 pages.

International Search Report for International Application No. PCT/JP2009/065649, dated Dec. 1, 2009, 1 page.

* cited by examiner

MOVING IMAGE ENCODING APPARATUS, MOVING IMAGE DECODING APPARATUS, MOVING IMAGE ENCODING METHOD, MOVING IMAGE DECODING METHOD, MOVING IMAGE ENCODING PROGRAM, MOVING IMAGE DECODING PROGRAM, AND MOVING IMAGE ENCODING/DECODING SYSTEM

RELATED APPLICATIONS

This application is a continuation of PCT/JP2009/065649 filed on Sep. 8, 2009, which claims priority to Japanese Application No. 2008-256601 filed on Oct. 1, 2008. The entire contents of these applications are incorporated herein by reference.

TECHNICAL FIELD

The present invention relates to a moving picture encoding apparatus, a moving picture decoding apparatus, a moving picture encoding method, a moving picture decoding method, a moving picture encoding program, a moving picture decoding program, and a moving picture encoding/decoding system for encoding/decoding a moving picture and in particular, relates to a bit length of each pixel of a picture in encoding/decoding processing.

BACKGROUND ART

A compression encoding technique is used so as to efficiently transmit or accumulate moving picture data. In the case of a moving picture, MPEG1, 2, 4 or H.261 to H.264 systems are widely used.

In order to improve the encoding efficiency, an encoding-target picture is divided into a plurality of target blocks, and then predictive encoding/decoding processing is performed. Specifically, a picture for one frame is divided into target blocks of 16×16 pixels. In the intra-frame predictive encoding method, a predicted signal is generated using an already reproduced, adjacent picture signal (a picture signal uncompressed from compressed picture data) which resides within the frame in which the encoding-target block resides, and a difference signal is then encoded which is obtained by subtracting the predicted signal from the signal of the target block.

The inter-frame predictive encoding method may be additionally used, in which a prediction signal of the target block is generated by referring to other pictures adjacent on the time axis in a moving picture, and a difference between the target block and the prediction signal is encoded. In this case, a motion detection is carried out for the target block by using other encoded and restored frames as reference pictures, and a prediction signal associated with the smallest difference is decided, and then the difference value between the target block and the prediction signal is calculated. Then, discrete cosine transformation and quantization processing are performed on the differential signal obtained by the intra-frame prediction or inter-frame prediction. Encoded data is generated by entropy encoding of a motion vector or mode information for specifying a prediction signal and a coefficient of discrete cosine transformation quantized.

The picture data encoded in this way is restored and reproduced in order to acquire a prediction signal of a next target block, and is temporarily stored in a frame memory as a reference picture.

As described above, in the conventional encoding/decoding processing, prediction or conversion processing is performed while the bit length of each pixel of an input picture is fixed. In a normal picture, each pixel of brightness and color difference components is expressed with 8 bits of information. Accordingly, the encoding/decoding processing, such as prediction and conversion, is also performed on each 8-bit pixel. The reproduced 8-bit reproduction picture signal is stored in a frame memory.

On the other hand, a technique of reducing the size of a frame memory or a memory access band (memory band) for downsizing and reducing the power consumption is disclosed in Patent Literature 1 mentioned below. In this technique, a reproduction picture is additionally compressed before it is stored in the frame memory. Specifically, a reproduction picture reproduced with 8 bits is quantized to become one with bits less than 8 bits and is then stored in the frame memory. When generating a prediction signal, the compressed reproduction picture is expanded and used as a reference picture. Thus, since the encoding/decoding processing is performed with the bit length of an input picture being fixed, the compression encoding performance is prevented from being lowered while the size or memory band of a frame memory is reduced.

CITATION LIST

Patent Literature

Patent Literature 1 is U.S. Pat. No. 6,222,886B1.

SUMMARY OF THE INVENTION

Technical Problem

However, if the size or memory band of the frame memory is reduced as in Patent Literature 1, the quality of a reproduced picture deteriorates because the reproduced picture is generated by expanding the bit length of each pixel which has been reduced. Since a prediction signal is generated using the reference picture, the accuracy of the prediction signal also deteriorates. As a result, a differential signal (residual signal) becomes large which is generated from the target block of the encoding target picture and the prediction signal, and the data length of the encoded data becomes long, which is obtained by encoding the differential signal, thereby causing a problem that the encoding efficiency is lowered.

It may be possible to add to the encoding and decoding process a process of processing a reproduction picture, using a reference picture stored in the frame memory. Where the bit length of a picture stored in a frame memory is shorter than the bit length of a reproduction picture prior to compression as disclosed in Patent Literature 1, in order to add such a process, it is necessary to eliminate the bit length difference between the reference picture and the reproduction picture by adding a new process of expanding the bit length of the reference picture in the frame memory or temporarily storing an uncompressed reproduction picture in the long bit length in an internal buffer before being stored in the frame memory. However, adding new processes of processing pictures would increase the realizing and processing costs, thereby limiting the adaptability.

The present invention has been made to solve the above-described problems, and it is an object of the present invention to provide a moving picture encoding apparatus, method, and program, a moving picture decoding apparatus, method, and program, and a moving picture encoding/decoding system capable of improving the encoding efficiency and the adaptability while avoiding an increase in the size or memory band of a frame memory.

Solution to Problem

In order to solve the above-described problems, a moving picture encoding apparatus according to the present invention comprises an input unit that receives a target picture whose pixels have a first bit length, an extension conversion unit that converts the target picture into an extended target picture having a second bit length longer than the first bit length, a storage unit that stores a reference picture whose pixels have a third bit length shorter than the second bit length, a prediction signal generating unit that generates a prediction signal, based on the reference picture stored in the storage unit, and convert the prediction signal into an extended prediction signal having the second bit length, a residual signal generating unit that generates a residual signal between the extended prediction signal and the extended target picture, an encoding unit that encodes the residual signal generated by the residual signal generating unit, a restoration unit that restores the encoded residual signal and adds the restored signal to the extended prediction signal to generate an extended reproduction picture, and a reduction conversion unit that converts the extended reproduction picture into a reproduction picture having the third bit length. The reproduction picture is stored in the storage unit as a reference picture.

With this configuration, a target picture whose pixels have the first bit length is encoded after being converted to have the second bit length. The encoded picture is restored and is then converted into a reproduction picture whose pixels have the third bit length shorter than the second bit length. This reproduction picture is stored in the storage unit (frame memory) as a reference picture. Accordingly, since the encoding process is performed after the target picture signal is converted to have a bit length longer than the bit length of the target signal, high-precision operations of the encoding processing become possible and the encoding efficiency can be improved. Moreover, since it is stored in a frame memory after converted to have a bit length shorter than the bit length when the encoding processing was performed, an increase in the size or memory band of the frame memory can be avoided. As a result, encoding efficiency can be improved while avoiding an increase in the size or memory band of the frame memory. Moreover, since both a reference picture stored in the storage unit and a reproduction picture have the third bit length, it is not necessary to add a process for eliminating the bit length difference between the reference picture and the reproduction picture even in the case of adding a process on a reproduction picture using a reference picture. Accordingly, realizing and processing costs for adding new processes, such as picture processing, are reduced and adaptability improves.

In addition, it is preferable that the moving picture encoding apparatus according to the present invention further comprises a picture processing unit that processes the reproduction picture, which is generated by the reduction conversion unit, using at least some of the reference pictures stored in the storage unit, and the reproduction picture processed by the picture processing unit is stored in the storage unit.

In addition, it is preferable that the third bit length is equal to the first bit length.

In addition, it is preferable that the encoding unit encodes at least one of the information items regarding the first, second, and third bit lengths.

Similarly, in order to solve the above-described problems, a moving picture decoding apparatus according to the present invention comprises an input unit that receives a data stream including a residual signal generated by performing predictive encoding in which a target picture whose pixels have the first bit length is converted into an extended target picture whose pixels have a second bit length, a storage unit that stores a reference picture whose pixels have a third bit length shorter than the second bit length, an analysis unit that extracts the encoded residual signal from the data stream and decodes the encoded residual signal, a residual signal restoration unit that restores a reproduced residual signal from the encoded residual signal decoded by the analysis unit, a prediction signal generating unit that generates a prediction signal, based on the reference picture stored in the storage unit, and converts the prediction signal into an extended prediction signal having the second bit length, a picture restoration unit that restores an extended reproduction picture by adding the extended prediction signal and the reproduced residual signal, and a first reduction conversion unit that converts the extended reproduction picture into a reproduction picture having the third bit length. The reproduction picture is stored in the storage unit as a reference picture.

With this configuration, an extended reproduction picture having the second bit length longer than the first bit length of a target picture is restored from the input data stream. The extended reproduction picture is converted into a reproduction picture whose pixels have the third bit length shorter than the second bit length, and this reproduction picture is stored in the storage unit (frame memory) as a reference picture. Accordingly, since the decoding process is performed after the target picture signal is converted to have a bit length longer than the bit length of the target signal, high-precision operations of the decoding processing become possible and the encoding efficiency can be improved. Moreover, since it is stored in a frame memory after converted to have a bit length shorter than the bit length when the decoding process was performed, an increase in the size or memory band of the frame memory can be avoided. As a result, the encoding efficiency can be improved while avoiding an increase in the size or memory band of the frame memory. Moreover, since both the reference picture stored in the storage unit and the reproduction picture have the third bit length, it is not necessary to add a process for eliminating the bit length difference between the reference picture and the reproduction picture even in the case of adding processing on a reproduction picture using a reference picture. Accordingly, realizing and processing costs for adding new processes, such as picture processing, are reduced and adaptability improves.

In addition, it is preferable that the moving picture decoding apparatus according to the present invention further comprises a picture processing unit that processes the reproduction picture, which is generated by the first reduction conversion unit, using at least some of the reference pictures stored in the storage unit, and the reproduction picture processed by the picture processing unit is stored in the storage unit.

In addition, it is preferable that the third bit length is equal to the first bit length.

In addition, it is preferable that at least one of the information items regarding the first, second, and third bit lengths is included in the data stream and processed after decoding by the analysis unit.

In addition, it is preferable that the moving picture decoding apparatus further comprises a second reduction conversion unit that converts the extended reproduction picture into a reproduction picture having the first bit length, and the reproduction picture generated by the second reduction conversion unit is transmitted to a display device.

The moving picture encoding apparatus and the moving picture decoding apparatus according to the present invention may also be regarded as an invention relating to a method or an invention relating to a program, and they can be described as follows. The invention relating to a method or the invention relating to a program has the same operations and effects.

A moving picture encoding method according to the present invention comprises an input step of inputting a target picture whose pixels have a first bit length, an extension conversion step of converting the target picture in an extended target picture having a second bit length longer than the first bit length, a prediction signal generating step of generating a prediction signal, based on a reference picture stored in a storage unit whose pixels have a third bit length shorter than the second bit length, and converting the prediction signal into an extended prediction signal having s the second bit length, a residual signal generating step of generating a residual signal between the extended prediction signal and the extended target picture, an encoding step of encoding the residual signal generated in the residual signal generating step, a restoration step of restoring the residual signal encoded in the encoding step and adding the restored signal to the extended prediction signal to generate an extended reproduction picture, a reduction conversion step of converting the extended reproduction picture into a reproduction picture having the third bit length, and a storage step of storing the reproduction picture in the storage unit.

In addition, it is preferable that the moving picture encoding method according to the present invention further comprises a picture processing step of processing the reproduction picture, which is generated in the reduction conversion step, using at least some of the reference pictures stored in the storage unit, and the reproduction picture processed in the picture processing step is stored in the storage unit in the storage step.

A moving picture decoding method according to the present invention comprises an input step of inputting a data stream including a residual signal generated by performing predictive encoding in which a target picture whose pixels have a first bit length is converted into an extended target picture whose pixels have a second bit length, an analysis step of extracting the encoded residual signal from the data stream and decoding the same, a residual signal restoration step of restoring a reproduced residual signal from the encoded residual signal decoded in the analysis step, a prediction signal generating step of generating a prediction signal, based on a reference picture stored in a storage unit whose pixels have a third bit length shorter than the second bit length, and converting the prediction signal into an extended prediction signal having the second bit length, a picture restoration step of restoring an extended reproduction picture by adding the extended prediction signal and the reproduced residual signal, a first reduction conversion step of converting the extended reproduction picture into a reproduction picture having the third bit length, and a storage step of storing the reproduction picture in the storage unit.

In addition, it is preferable that the moving picture decoding method according to the present invention further comprises a picture processing step of processing the reproduction picture, which is generated in the first reduction conversion step, using at least some of the reference pictures stored in the storage unit, and the reproduction picture processed in the picture processing step is stored in the storage unit in the storage step.

A storage medium storing a moving picture encoding program according to the present invention causes a computer to function as: an input unit that inputs a target picture whose pixels have a first bit length, an extension conversion unit that converts the target picture into an extended target picture having a second bit length longer than the first bit length, a storage unit that stores a reference picture whose pixels have a third bit length shorter than the second bit length, a prediction signal generating unit that generates a prediction signal, based on the reference picture stored in the storage unit, and convert the prediction signal into an extended prediction signal having the second bit length, a residual signal generating unit that generates a residual signal between the extended prediction signal and the extended target picture, an encoding unit that encodes the residual signal generated by the residual signal generating unit, a restoration unit that restores the encoded residual signal and adds the restored signal to the extended prediction signal to generate an extended reproduction picture, and a first reduction conversion unit that converts the extended reproduction picture into a reproduction picture having the third bit length. The reproduction picture is stored in the storage unit as a reference picture.

In addition, it is preferable that the moving picture encoding program according to the present invention causes a computer to further function as a picture processing unit that processes the reproduction picture, which is generated by the reduction conversion unit, using at least some of the reference pictures stored in the storage unit, and the reproduction picture processed by the picture processing unit is stored in the storage unit.

A moving picture decoding program according to the present invention causes a computer to function as an input unit that inputs a data stream including a residual signal generated by performing predictive encoding in which a target picture whose pixels have as a first bit length is converted into an extended target picture whose pixels have a second bit length, a storage unit that stores a reference picture whose pixels have a third bit length shorter than the second bit length, an analysis unit that extracts the encoded residual signal from the data stream and decodes the same, a residual signal restoration unit that restores a reproduced residual signal from the encoded residual signal decoded by the analysis unit, a prediction signal generating unit that generates a prediction signal, based on the reference picture stored in the storage unit, and converts the prediction signal into an extended prediction having the second bit length, a picture restoration unit that restores an extended reproduction picture by adding the extended prediction signal and the reproduced residual signal, and a first reduction conversion unit that converts the extended reproduction picture into a reproduction picture having the third bit length. The reproduction picture is stored in the storage unit as a reference picture.

In addition, it is preferable that the moving picture decoding program according to the present invention causes a computer to further function as a picture processing unit that processes the reproduction picture, which is generated by the first reduction conversion unit, using at least some of the reference pictures stored in the storage unit and the reproduction picture processed by the picture processing unit is stored in the storage unit.

The moving picture encoding apparatus and the moving picture decoding apparatus according to the present invention may also be regarded as an invention relating to a moving picture encoding/decoding system including them and can also be regarded as an invention relating to a moving picture encoding/decoding method including them if they are regarded as an invention relating to a method, and they can be described as follows. These inventions have the same operations and effects as in the moving picture encoding apparatus and the moving picture decoding apparatus.

A moving picture encoding/decoding system according to the present invention is a moving picture encoding/decoding system for encoding and decoding moving picture data and comprises a moving picture encoding apparatus which performs compression encoding of the moving picture data, and a moving picture decoding apparatus which decodes the moving picture data compression-encoded by the moving picture encoding apparatus. The moving picture encoding apparatus comprises an input unit that inputs a target picture whose pixels have a first bit length, an extension conversion unit that converts the target picture into an extended target picture having a second bit length longer than the first bit length, a storage unit that stores a reference picture whose pixels have a third bit length shorter than the second bit length, a prediction signal generating unit that generates a prediction signal, based on the reference picture stored in the storage unit, and converts the prediction signal into an extended prediction signal having the second bit length, a residual signal generating unit that generates a residual signal between the extended prediction signal and the extended target picture, an encoding unit that encodes the residual signal generated by the residual signal generating unit, a restoration unit that restoring the encoded residual signal and adds the restored signal to the extended prediction signal to generate an extended reproduction picture, and a reduction conversion unit that converts the extended reproduction picture into a reproduction picture having the third bit length, and the reproduction picture is stored in the storage unit as a reference picture. The moving picture decoding apparatus comprises an input unit that inputs a data stream including a residual signal generated by performing predictive encoding in which a target picture whose pixels have a first bit length is converted into an extended target picture whose pixels have a second bit length, a storage unit that stores a reference picture whose pixels have a third bit length shorter than the second bit length, an analysis unit that extracts the encoded residual signal from the data stream and decodes the same, a residual signal restoration unit that restores a reproduced residual signal from the encoded residual signal decoded by the analysis unit to, a prediction signal generating unit that generates a prediction signal, based on the reference picture stored in the storage unit, and converts the prediction signal into an extended prediction signal having the second bit length, a picture restoration unit that restores an extended reproduction picture by adding the extended prediction signal and the reproduced residual signal, and a first reduction conversion unit that converts the extended reproduction picture into a reproduction picture having the third bit length, and the reproduction picture is stored in the storage unit as a reference picture.

A moving picture encoding/decoding method according to the present invention is a moving picture encoding/decoding method for encoding and decoding moving picture data and comprises a moving picture encoding method of performing compression encoding of the moving picture data, and a moving picture decoding method of decoding the moving picture data compression-encoded in the moving picture encoding method. The moving picture encoding method comprises an input step of inputting a target picture whose pixels have a first bit length, an extension conversion step of converting the target picture into an extended target picture having a second bit length longer than the first bit length, a prediction signal generating step of generating a prediction signal, based on a reference picture stored in a storage unit, whose pixels have a third bit length shorter than the second bit length, and converting the prediction signal into an extended prediction signal having the second bit length, a residual signal generating step of generating a residual signal between the extended prediction signal and the extended target picture, an encoding step of encoding the residual signal generated in the residual signal generating step, a restoration step of restoring the residual signal encoded in the encoding step and adding the restored signal to the extended prediction signal to generate an extended reproduction picture, a reduction conversion step of converting the extended reproduction picture into a reproduction picture having the third bit length, and a storage step of storing the reproduction picture in the storage unit. The moving picture decoding method comprises an input step of inputting a data stream including a residual signal generated by performing predictive encoding in which a target picture whose pixels have a first bit length is converted into an extended target picture whose pixels have a second bit length, an analysis step of extracting the encoded residual signal from the data stream and decoding the same, a residual signal restoration step of restoring a reproduced residual signal from the encoded residual signal decoded in the analysis step to, a prediction signal generating step of generating a prediction signal, based on a reference picture stored in a storage unit for storing a reference picture, whose pixels have a third bit length shorter than the second bit length, and converting the prediction signal into an extended prediction signal having the second bit length, a picture restoration step of restoring an extended reproduction picture by adding the extended prediction signal and the reproduced residual signal, a first reduction conversion step of converting the extended reproduction picture into a reproduction picture having the third bit length, and a storage step of storing the reproduction picture in the storage unit.

Advantageous Effects of Invention

According to the present invention, the encoding efficiency and the adaptability can be improved while avoiding an increase in the size or memory band of a frame memory.

DETAILED DESCRIPTION OF THE PREFERRED EMBODIMENTS

Hereinafter, embodiments according to the present invention will be described with reference to FIGS. 1 to 9. The present embodiment provides a moving picture encoding/decoding system for encoding and decoding the moving picture data which includes a moving picture encoding apparatus performing compression encoding of the moving picture data, and a moving picture decoding apparatus decoding the moving picture data compression-encoded by the moving picture encoding apparatus. An explanation on each of the moving picture encoding apparatus and the moving picture decoding apparatus will be given below.
(Moving Picture Encoding Apparatus)

Figure 1:
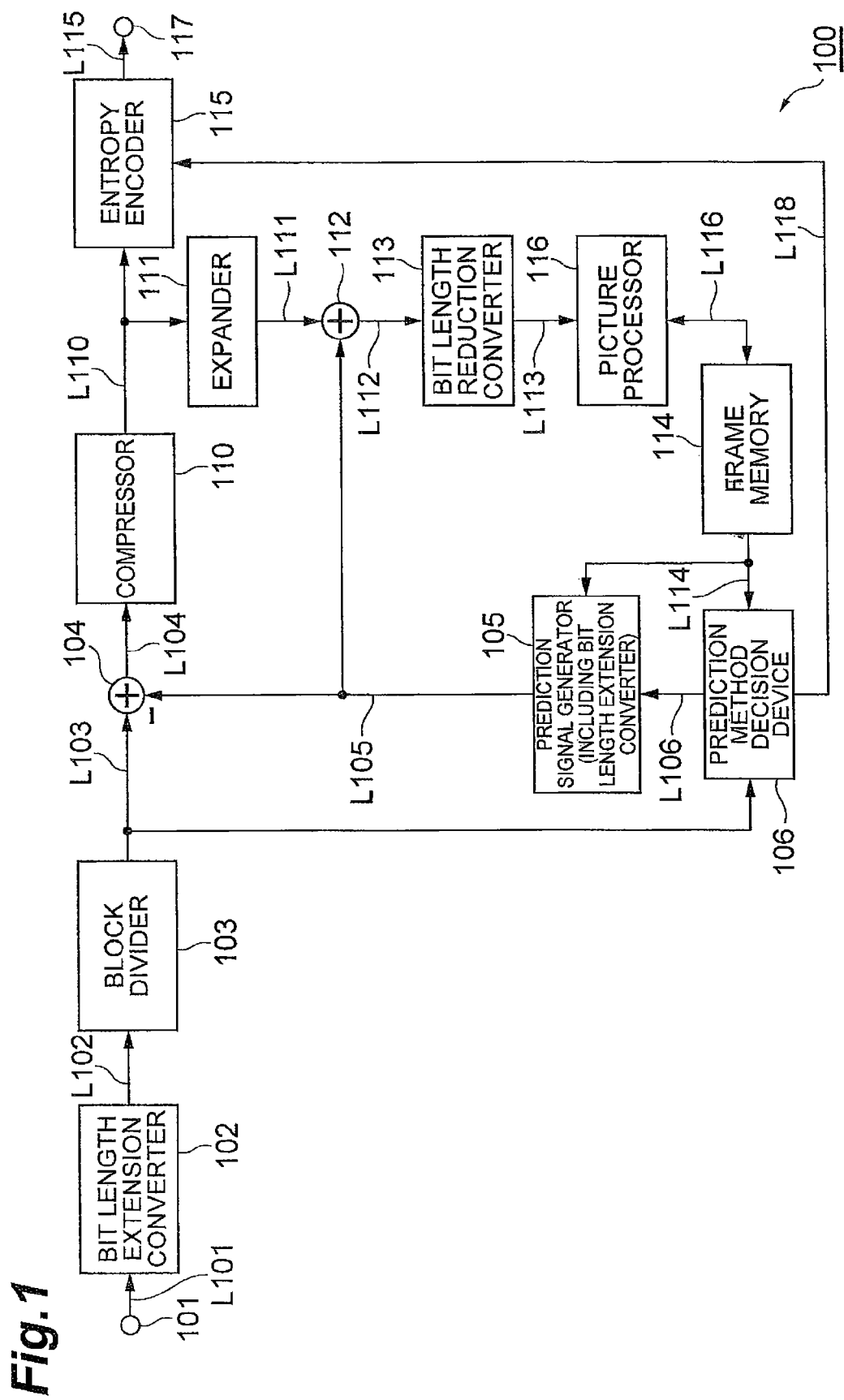
FIG. 1 is a block diagram of a moving picture encoding apparatus which performs a bit length conversion processing according to an embodiment of the present invention.

FIG. 1 shows a block diagram of a moving picture encoding apparatus 100 which performs bit length conversions according to an embodiment of the present invention. The moving picture encoding apparatus 100 includes an input terminal (input unit) 101, a bit length extension converter (extension conversion unit) 102, a block divider 103, a differentiator (residual signal generating unit) 104, a prediction signal generator (prediction signal generating unit) 105, a prediction method decision device 106, a compressor (encoding unit) 110, an expander (restoration unit) 111, an adder (restoration unit) 112, a bit length reduction converter (reduction conversion unit) 113, a frame memory (storage unit) 114, an entropy encoder (encoding unit) 115, a picture processor (picture processing unit) 116, and an output terminal 117.

An operation of each constituent section in the moving picture encoding apparatus 100 will be described below. A plurality of pictures which forms a moving picture is input to the input terminal 101. In this specification, the bit length of an encoding target picture is assumed to be N bits (first bit length). The inputted N-bit picture is converted by the bit length extension converter 102 into an extended target picture, which has a bit length of M bits (second bit length). M is a positive integer larger than N.

The bit length extension converter 102 converts the N-bit encoding target picture into an M-bit extended target picture. An example of a bit extension method is a method of shifting an N-bit picture signal to the left by (M−N) bits, even though the present invention is not limited thereto. In the method, the signal value of lower (M−N) of an M-bit signal may be set so as to improve the encoding efficiency. In addition, in order to improve the realizing efficiency, an M-bit dynamic range may be controlled to become $-2^{(M-1)}$ to $(2^{(M-1)}-1)$ (not a non-negative integral variable but also a signed integral variable may be used).

With respect to the extended target picture which has been converted by the bit length extension converter 102, the block divider 103 divides an encoding target picture into a plurality of small regions (here, for example, blocks having 16×16 pixels). The following compression and encoding processing is executed on each of the divided blocks.

On blocks to be encoded (hereinafter, referred to as "target blocks"), the prediction method decision device 106 and the prediction signal generator 105 execute a process of generating an M-bit extended prediction signal.

The prediction method decision device 106 executes an intra-frame prediction or inter-frame prediction and selects, from a plurality of candidates, a prediction method in which the amount of code necessary for encoding a target block input through a line L103 is small and residuals with a target block is small. In FIG. 1, since an M-bit signal is inputted through the line L103, an M-bit extended prediction signal is also generated in the prediction method decision device 106. Although the candidates for the prediction method may include, but not limited to, a method of generating a prediction signal using an L-bit reference picture stored in the frame memory 114 or a method of generating a prediction signal using an M-bit reproduction signal before being inputted to the bit length reduction converter 113. The former method may include, but not limited to, a method of generating a P-bit (P is a positive number which satisfies P>L) prediction signal, such as performing a weighting addition of a plurality of L-bit reproduction pixels. In this method, the realizing efficiency improves if the method of generating a prediction signal is set such that P =M is satisfied. When the value of P is larger than the value of M, an M-bit extended prediction signal is generated by, for example, processing a P-bit prediction signal using a rounding method, such as round-off. When the value of P is smaller than the value of M, an M-bit extended prediction signal is generated by shifting a P-bit prediction signal to the left by (M−P) bits, for example. The prediction mode information indicating the selected prediction method, the motion information according to inter-frame prediction, and the like are outputted to the entropy encoder 115 through a line L118 as side information. The entropy encoder 115 performs entropy encoding of the side information and quantized transform coefficients inputted through L110 using a method of a variable length code, an arithmetic code, or the like.

The prediction signal generator 105 generates an M-bit extended prediction signal on the basis of the side information inputted through L106 and outputs it to the differentiator 104 and the adder 112 through a line L105. Thus, the process of extending the bit length from L bits to M bits is performed by the prediction signal generator 105 and the prediction method decision device 106.

The M-bit extended prediction signal generated by the prediction signal generator 105 is outputted to the differentiator 104 through the line L105, and the differentiator 104 generates a residual signal by subtracting the extended prediction signal from the M-bit signal of a target block inputted through the line L103. The generated residual signal is inputted to the compressor 110 through L104 and is compressed into data (encoded data) whose amount of information is small.

The compressor 110 is generally formed by a transformer which converts a differential signal into transform coefficients in the frequency domain, and a quantizer which performs quantization processing on the transform coefficients. However, one of them may be omitted, or another configuration may be adopted. Although the bit length of the quantized transform coefficient is M bits, it may become a signal with a bit length longer than M bits during intermediate processing by a compressor. For example, since a residual signal may have a minus value, it usually becomes a bit length of (M+1) bits. The efficiency of transformation improves if a transform coefficient is set to have a bit length longer than (M+1) bits. The quantizer rounds the quantized transform coefficient to an M-bit signal and outputs the M-bit signal to the entropy encoder 115 and the expander 111 through L110.

The entropy encoder 115 converts the quantized transform coefficient into a variable length code and outputs the variable length code as a bit stream through the output terminal 117. In addition, arithmetic encoding may be applied instead of the variable length code.

The expander 111 and the adder 112 generate an M-bit extended reproduction signal by decoding the quantized transform coefficient which is encoded data. The expander 111 is generally formed by an inverse quantizer which performs inverse quantization on a quantized transform coefficient, and an inverse transformer which reproduces a residual signal by performing inverse transformation on a transform coefficient. However, one of them may be omitted, or another configuration may be adopted.

The adder 112 restores an M-bit extended reproduction signal by adding an extended prediction signal to the reproduced residual signal. Here, although the bit length of the extended reproduction signal is M bits, it may become a signal with a bit length longer than M bits during intermediate processing performed by the expander. For example, since a residual signal may have a minus value, it usually becomes a bit length of (M+1) bits. In addition, in order to improve the calculation accuracy, the inverse-quantized transform coefficient is set to have a bit length longer than (M+1) bits.

The bit length reduction converter 113 converts the M-bit reproduction signal into an L-bit (third bit length) reproduction signal. L is a positive integer equal to or less than N and has a value depending on the size of a frame memory. Since the size of the frame memory is usually the same as the bit length of an input picture, L=N is set.

The bit length reduction converter 113 converts the M-bit reproduction signal into an L-bit reproduction signal. The method of converting the bit length includes, but not limited to, a rounding method based on round-off or, more specifically, a method of adding $2^{(M-L-1)}$ to an L-bit reproduction signal and then shifting it to the right by (M−N) bits. In addition, a rounding method based on cut-off may be used instead of round-off, or another rounding method may be used. In addition, when the dynamic range of an M-bit signal is controlled to be $-2^{(M-1)}$ to $(2^{(M-1)}-1)$, it is necessary to perform a process of clipping the dynamic range of the L-bit signal to 0 to $(2^L-1)$ after the rounding processing.

The L-bit reproduction signal is inputted to the picture processor 116 through a line L113. The picture processor 116 performs, for example, a process of improving the picture quality such as disclosed in United States Patent Application Publication No. 2006/153301 or a process of removing block noise such as defined in H.264 and the like on the reproduction signal. The L-bit reproduction signal restored in this way is stored in the frame memory 114 so that it is used as a reference picture when the next picture is encoded. In order to perform between target blocks a signal processing, such as the picture quality improvement process or the block noise removal process described above, the picture processor 116 uses some or all of reproduction signals already stored in the frame memory 114 in addition to the reproduction signal inputted through the line L113.

A final bit stream is generated by performing these processing for all target blocks.

In order to decode the data encoded by the entropy encoder 115 of FIG. 1 using a moving picture decoding apparatus, which will be described later, the moving picture decoding apparatus needs to know the values of N, M, and L indicating the bit lengths. These values may be set in advance, or it is possible to determine one, two, or all of them by an encoding apparatus and encode them in a sequence unit or a frame unit. The values of N and L are values regarding the apparatus configuration, and are usually fixed values. The value of M is a value indicating the processing accuracy in a compressor or an expander, and may be changed in a frame unit or a block unit. Accordingly, the value of M may be determined in the frame unit or the block unit and the value may be encoded.

For example, a plurality of sets of the values indicative of the bit lengths N, M, and L used in the bit length extension converter 102, the bit length reduction converter 113, the prediction method decision device 106, and the like are prepared in advance in the moving picture encoding apparatus 100, and one set of the values indicative of the bit lengths N, M, and L is selected in response to a command from a control unit (not shown), and the encoding processing is performed. This is performed for all sets of the values indicative of the bit lengths N, M, and L. The entropy encoder 115 compares the encoded data from the respective sets and selects the encoded data which has the shortest bit length and accordingly has the best compression rate. Moreover, at this time, some or all of the values indicative of the bit lengths N, M, and L are encoded by the entropy encoder 115 and are included in the bit stream data together with the encoded data.

Next, referring to FIG. 2, a moving picture encoding apparatus 100-2 according to the present invention will be described which is a modification of the moving picture encoding apparatus 100.

In the moving picture encoding apparatus 100 of FIG. 1, the bit length extension converter 102 converts a target picture into an extended target picture, and then the block divider 103 divides an extended target block included in the extended target picture into target blocks. On the other hand, the moving picture encoding apparatus 100-2 of FIG. 2 is different from the moving picture encoding apparatus 100 in that the block divider 103 divides an extended target block into target blocks and then the bit length extension converter 102 converts a target picture including the target blocks into an extended target picture.

Moreover, in the moving picture encoding apparatus 100 of FIG. 1, the prediction signal generator 105 generates an M-bit extended prediction signal using an L-bit reference picture. On the other hand, the moving picture encoding apparatus 100-2 of FIG. 2 is different from the moving picture encoding apparatus 100 in that a prediction signal generator 105a first generates an L-bit prediction signal and a bit length extension converter 105b extends the L-bit prediction signal to an M-bit prediction signal.

An operation of the moving picture encoding apparatus 100-2 of FIG. 2 will be described. Here, N =L is assumed. An N-bit signal of a target block divided by the block divider 103 is inputted to a prediction method decision device 106-2 through the line L103. The prediction method decision device 106-2 generates a plurality of prediction signals using the N-bit reference signal or the N-bit reproduction signal converted by the bit length reduction converter 113 and selects an optimal prediction method. The prediction signal generator 105a generates an N-bit prediction signal. The generated N-bit prediction signal is inputted to the bit length extension converter 105b through a line L105a and is converted into an M-bit extended prediction signal.

Figure 2:
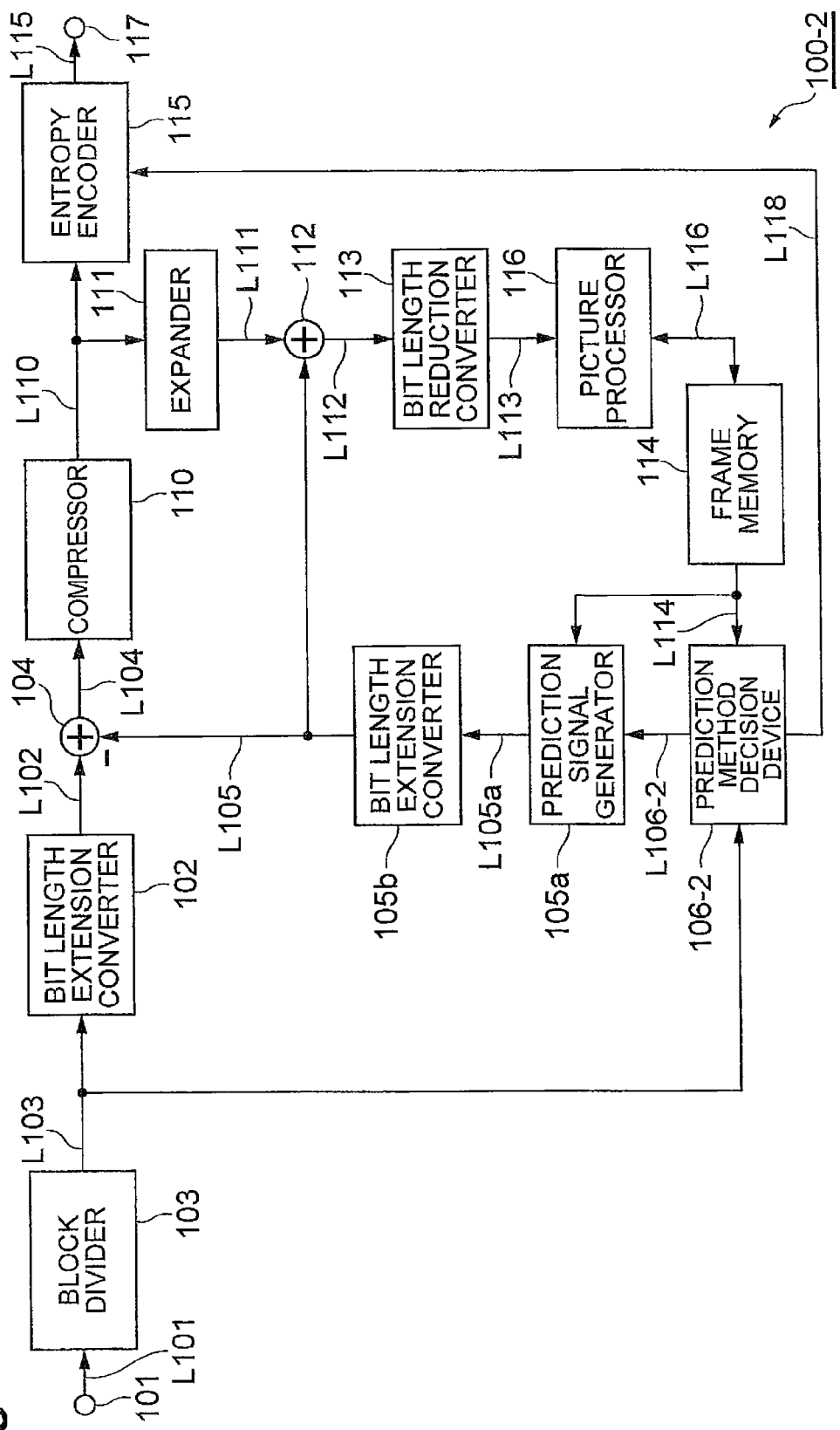
FIG. 2 is a block diagram showing a modification of the moving picture encoding apparatus shown in FIG. 1.

In addition, the bit length conversion method which is a feature of the present invention is also applicable in an apparatus having both the moving picture encoding apparatuses 100 and 100-2 shown in FIGS. 1 and 2. In this case, the candidates of the prediction method used by the prediction method decision devices 106 and 106-2 may include a method of generating an M-bit extended prediction signal directly from an L-bit reference picture or a method of generating an L-bit prediction signal and then converting the L-bit prediction signal into an M-bit prediction signal using a bit length extension converter.

(Moving Picture Encoding Method)

Figure 3:
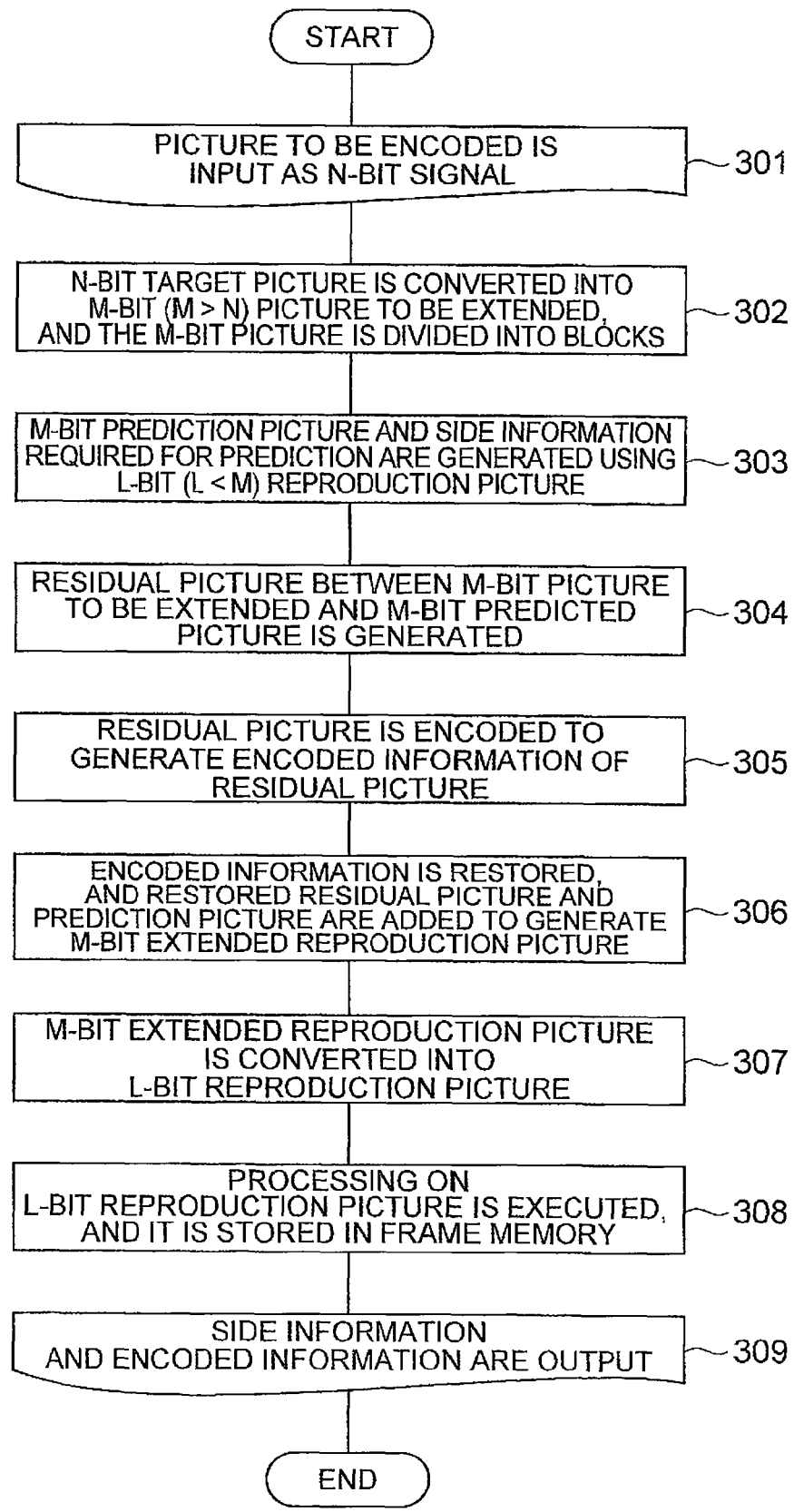
FIG. 3 is a flow chart showing a moving picture encoding method executed by the moving picture encoding apparatus shown in FIG. 1.

FIG. 3 shows a flow chart of moving picture encoding processing performed by the moving picture encoding apparatus 100 which includes bit length conversion. When an encoding target picture is inputted to the input terminal 101 as an N-bit signal (step 301: input step), the bit length extension converter 102 converts the N-bit target picture into an M-bit (M>N) extended target picture, and the block divider 103 divides the extended target picture into a plurality of small blocks (step 302: extension conversion step). In addition, the order of bit length extension conversion and block division may be reversed.

Then, the prediction method decision device 106 and the prediction signal generator 105 decide one prediction method for each target block, from among a plurality of prediction methods, using the L-bit reference picture stored in the frame memory 114, and generate an M-bit extended prediction signal. At the same time, side information required for generation of the prediction signal, such as the prediction mode information indicating a selected prediction method or the motion information according to inter-frame prediction, is generated (step 303: prediction signal generation step). In addition, the method of generating a prediction signal may include a method of generating an M-bit prediction signal directly from an L-bit signal or a method of generating an L-bit prediction signal and then converting the L-bit prediction signal into an M-bit extended prediction signal using the bit length extension converter 105b.

The differentiator 104 generates a residual picture of the M-bit extended target picture and the M-bit prediction picture (step 304: residual signal generation step), and the compressor 110 converts and quantizes the residual picture to generate the encoded information of the residual picture (step 305: encoding step).

Then, the expander 111 restores the encoded information by the operations of inverse quantization and inverse transformation, and the adder 112 adds the restored residual picture and the prediction picture to generate an M-bit extended reproduction picture (step 306: restoration step).

The bit length reduction converter 113 converts the M-bit extended reproduction picture into an L-bit reproduction picture (step 307: reduction conversion step). The picture processor 116 performs processing on the L-bit reproduction picture, using, for example, a method disclosed in United States Patent Application Publication No. 2006/153301 and stores it in the frame memory 114 in order to use the reproduction picture after processing as a reference picture when generating a prediction signal (step 308: picture processing step and storage step). In this case, the picture processor 116 uses the reproduction signal already stored in the frame memory 114 in addition to the reproduction signal converted into L bits in order to perform signal processing between target blocks. The above-described side information and encoded information generated are compressed into bit stream data by the entropy encoder 115 (step 309). When it is necessary to encode any of the bit numbers N, M, or L, it is encoded by the entropy encoder 115 and is included in the bit stream data.

As pointed out in the explanation regarding the moving picture encoding apparatus, the bit length conversion processing in the present invention is not limited to a specific bit length extension method, bit length reduction method or prediction method.

A final bit stream is generated by executing these steps for all target blocks.

(Moving Picture Decoding Apparatus)

Figure 4:
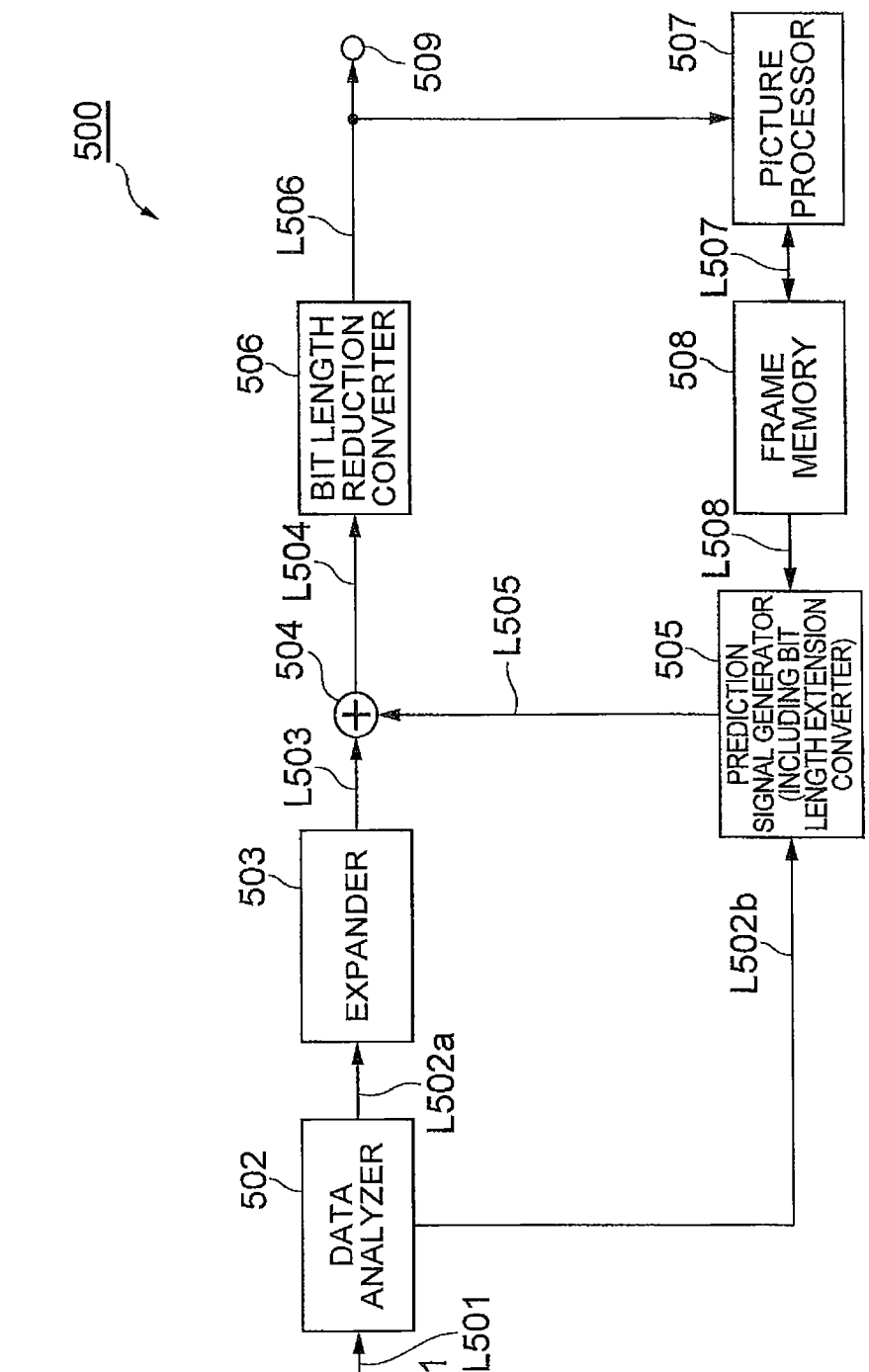
FIG. 4 is a block diagram of a moving picture decoding apparatus which performs a bit length conversion processing according to an embodiment of the present invention.

FIG. 4 shows a block diagram of a moving picture decoding apparatus 500 which performs the bit length conversion according to the present invention. The moving picture decoding apparatus 500 includes an input terminal (input unit) 501, a data analyzer (analysis unit) 502, an expander (residual signal restoration unit) 503, an adder (picture restoration unit) 504, a prediction signal generator (prediction signal generating unit) 505, a bit length reduction converter (first reduction conversion unit) 506, a picture processor (picture processing unit) 507, a frame memory (storage unit) 508, and a picture output terminal 509.

An operation of each constituent section in the moving picture decoding apparatus 500 will be described below. A bit stream is input to the input terminal 501 which includes the encoded data of a residual signal of a target block and the side information necessary for generating an extended prediction signal of each target block. In the present embodiment, a bit stream obtained by processing in the moving picture encoding apparatus 100 of FIG. 1 is inputted to the moving picture decoding apparatus 500.

The data analyzer 502 analyzes the input data (input bit stream) and decodes the side information and the encoded data (quantized transform coefficient) of a residual signal. In addition, when any value of M, N, and L which is the information indicating the bit length is included in the input data, the value is decoded and notified to a bit length reduction converter or a prediction signal generator which will be described later. In addition, variable length decoding or arithmetic decoding is used as the decoding method.

The encoded data (quantized transform coefficient) of the decoded residual signal is inputted to the expander 503 through a line L502a and is restored into a residual signal. The expander 503 is generally formed by an inverse quantizer which performs inverse quantization on a quantized transform coefficient, and an inverse transformer which reproduces a residual signal by performing inverse transformation on a transform coefficient. However, one of the inverse quantizer and the inverse transformer may be omitted, or another configuration may be adopted.

On the other hand, the side information decoded by the data analyzer 502 is transmitted to the prediction signal generator 505 through a line L502b. On the basis of the side information, the prediction signal generator 505 generates an M-bit extended prediction signal in the same procedure as performed by the prediction signal generator 105 of the moving picture encoding apparatus. The adder 504 generates an M-bit extended reproduction signal by adding the extended prediction signal and the restored residual signal. Here, although the bit length of the extended reproduction signal is M bits, it may be a signal with a bit length longer than M bits during intermediate processing performed by the expander 503, the adder 504, or the like. For example, since a residual signal may have a minus value, it usually becomes a bit length of (M+1) bits. In addition, in order to improve the calculation accuracy, the inverse-quantized transform coefficient may be set to have a bit length longer than (M+1) bits.

The bit length reduction converter 506 converts the M-bit reproduction signal into an L-bit reproduction signal. L is a positive integer equal to or less than N and has a value depending on the size of a frame memory. Since the size of a frame memory is the same as the bit length of an input picture, L=N is set. FIG. 3 is an example when L=N.

The L-bit reproduction signal is inputted to the picture processor 507 through a line L506. The picture processor 507 performs a process of improving the picture quality as disclosed in United States Patent Application Publication No. 2006/153301 or a process of removing block noise as defined in H.264 and the like on the reproduction signal. The L-bit reproduction signal restored in this way is stored in the frame memory 508 so that it is used as a reference picture when generating a prediction signal. The picture processor 507 uses the reproduction signal already stored in the frame memory

508 in addition to the reproduction signal input through the line L506 in order to perform signal processing between blocks.

The moving picture data is restored by repeating these processes until all data items of the bit stream are processed.

Next, a modification of the moving picture decoding apparatus 500 according to the present embodiment will be described with reference to FIGS. 5 and 6.

When the value of the bit number L is different from the value of the bit number N, a process of converting the M-bit reproduction signal into the N-bit reproduction signal needs to be added to the moving picture decoding apparatus 500 of FIG. 4 in order to output an N-bit reproduction signal. The configuration is shown in FIG. 5 of a moving picture decoding apparatus 500-2. In the moving picture decoding apparatus 500-2 of FIG. 5, the bit length reduction converter (second reduction conversion unit) 506 converts an M-bit reproduction signal into an L-bit reproduction signal, and the bit length reduction converter 510 converts the M-bit reproduction signal into an N-bit reproduction signal.

Figure 6:
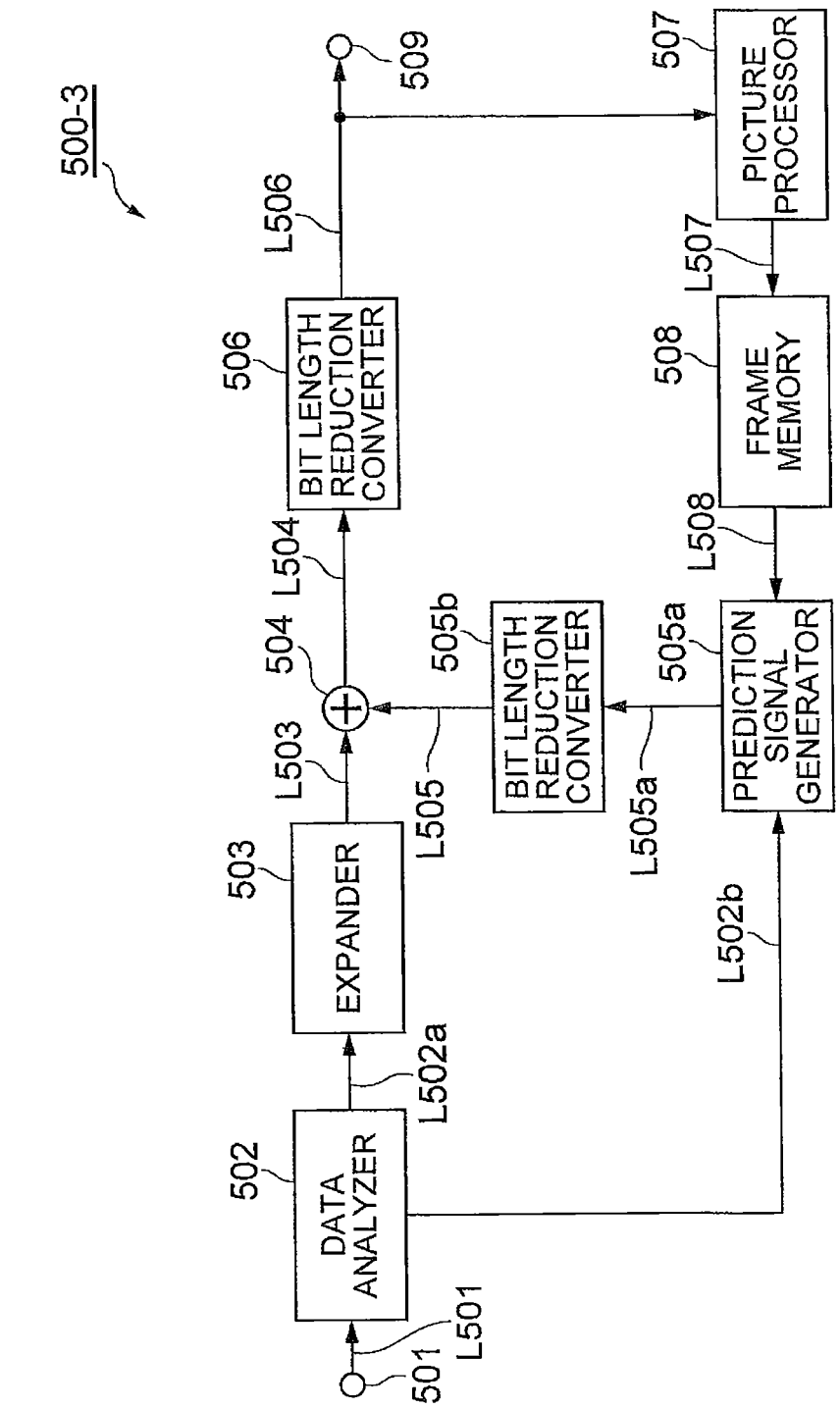
FIG. 6 is a block diagram showing a modification of the moving picture decoding apparatus shown in FIG. 4.

FIG. 6 shows the configuration of a moving picture decoding apparatus 500-3 which decodes the bit stream data generated by the moving picture encoding apparatus 100-2 which is a modification of the moving picture encoding apparatus 100 described above. Here, N=L is assumed. The prediction signal generator 505a generates an N-bit prediction signal and inputs the N-bit prediction signal to a bit length extension converter 505b through a line L505a. The bit length extension converter 505b extends the N-bit prediction signal to an M-bit extended prediction signal and outputs the M-bit extended prediction signal to the adder 504 through a line L505.

In addition, the bit length conversion method which is a feature of the present invention is also applicable in an apparatus having both the configuration of the moving picture decoding apparatus 500 shown in FIG. 4 and the configuration of the moving picture decoding apparatus 500-3 shown in FIG. 6. In this case, the prediction modes in the prediction signal generators 505 and 505a include a method of generating an M-bit extended prediction signal directly from an L-bit reference picture or a method of generating an L-bit prediction signal and then converting the L-bit prediction signal into an M-bit prediction signal using a bit length extension converter, and it is selectively processed according to the decoded side information.

(Moving Picture Decoding Method)

Figure 7:
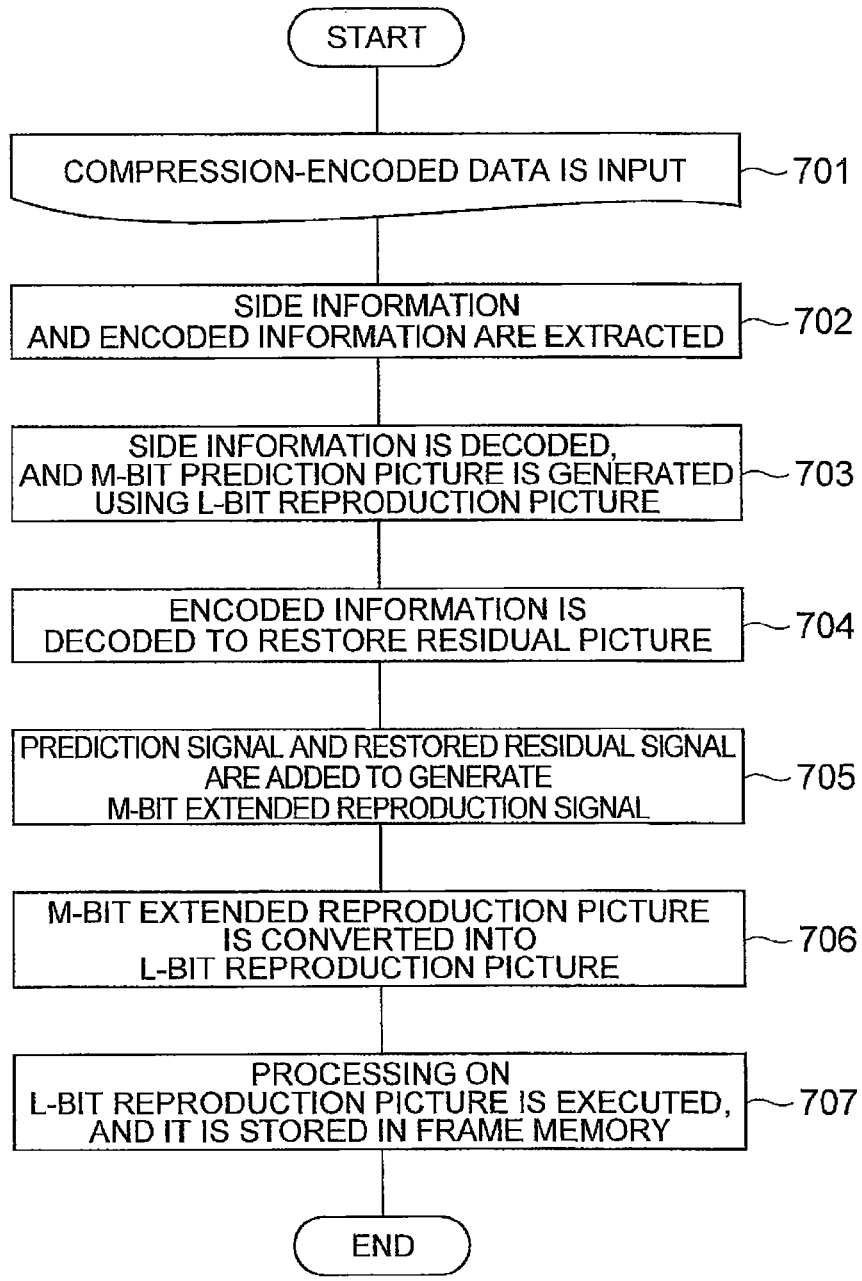
FIG. 7 is a flow chart showing a moving picture decoding method executed by the moving picture decoding apparatus shown in FIG. 4.

FIG. 7 shows a flow chart of moving picture decoding processing including bit length conversion, which is executed by the moving picture decoding apparatus 500. The compression-encoded data is inputted to the input terminal 501 (step 701: input step). Then, the data analyzer 502 performs entropy decoding on the input data and extracts the encoded information (quantized transform coefficient) and the side information (step 702: analysis step). In this case, when the values of M, N, and L are included in the input data, they are decoded and used for bit length reduction conversion or prediction signal generation processing which will be described later.

The prediction signal generator 505 decodes the side information and generates an M-bit extended prediction signal using the L-bit reproduction picture (step 703: prediction signal generation step). The methods of generating a prediction signal include a method of generating an M-bit prediction signal directly from an L-bit signal or a method of generating an L-bit prediction signal and then converting the L-bit prediction signal into an M-bit extended prediction signal using the bit length extension converter 505b.

At the same time, the expander 503 restores a transform coefficient by performing inverse quantization on the extracted quantized transform coefficient and restores a residual signal by performing inverse transformation on the transform coefficient (step 704: residual signal restoration step). The adder 504 generates an M-bit extended reproduction signal by adding the extended prediction signal and the restored residual signal (step 705: picture restoration step).

Then, the bit length reduction converter 510 converts the M-bit extended reproduction picture into an L-bit reproduction picture (step 706: first reduction conversion step). Here, N=L is assumed. The picture processor 507 performs processing on the L-bit reproduction picture, using, for example, a method disclosed in United States Patent Application Publication No. 2006/153301 and stores the processed reproduction picture in the frame memory 508 in order to use the processed reproduction picture as a reference picture when generating a prediction signal (step 707: picture processing step and storage step). The picture processor 507 uses the reproduction signal already stored in the frame memory 508 in addition to the reproduction signal converted into L bits in order to perform signal processing between target blocks.

The moving picture data is restored by repeating these steps until all data items in the bit stream are processed.

Figure 5:
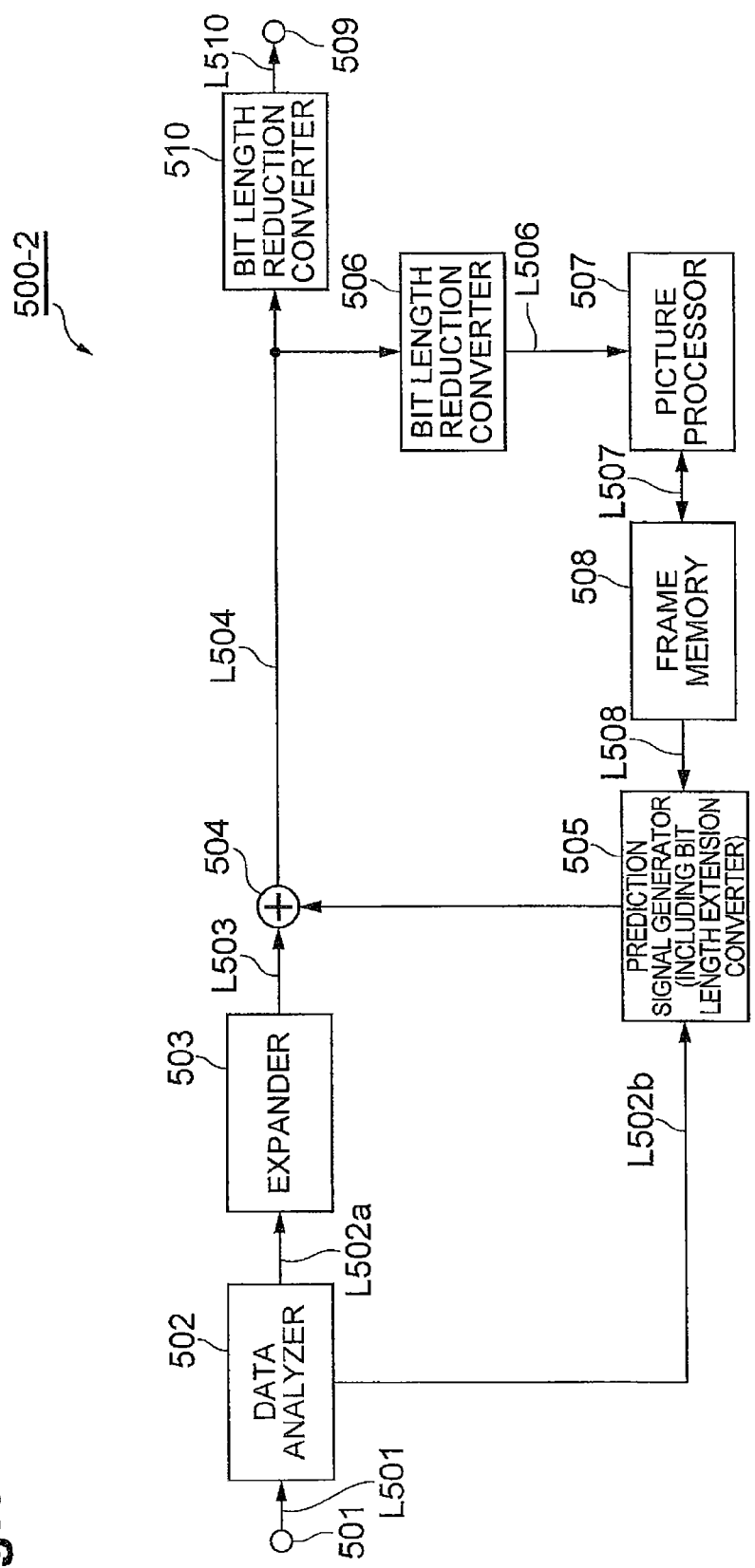
FIG. 5 is a block diagram showing a modification of the moving picture decoding apparatus shown in FIG. 4.

Moreover, when L is not equal to N like the configuration of the moving picture decoding apparatus 500-2 of FIG. 5, a step of generating an N-bit reproduction picture is added to the bit length reduction converter 510.

As pointed out in the explanation regarding the moving picture decoding apparatus, the bit length conversion process in the present invention is not limited to a specific bit length extension method, specific bit length reduction method or prediction method.

(Moving Picture Encoding Program and Moving Picture Decoding Program)

The present invention according to the moving picture encoding apparatus 100 may be regarded as an invention relating to a moving picture encoding program for causing a computer to operate as a moving picture encoding apparatus. Alternatively, a moving picture encoding method according to the present embodiment may also be provided as a program stored in a recording medium. In addition, the invention according to the moving picture decoding apparatus 500 may be regarded as an invention relating to a moving picture decoding program for causing a computer to function as a moving picture decoding apparatus. Alternatively, a moving picture decoding method related to the present embodiment may also be provided as a program stored in a recording medium. For example, the moving picture encoding program and the moving picture decoding program are provided in a state stored in a recording medium. As recording media, recording media such as a flexible disk, a CD-ROM, and a DVD, recording media such as a ROM, or a semiconductor memory are exemplified.

Figure 8:
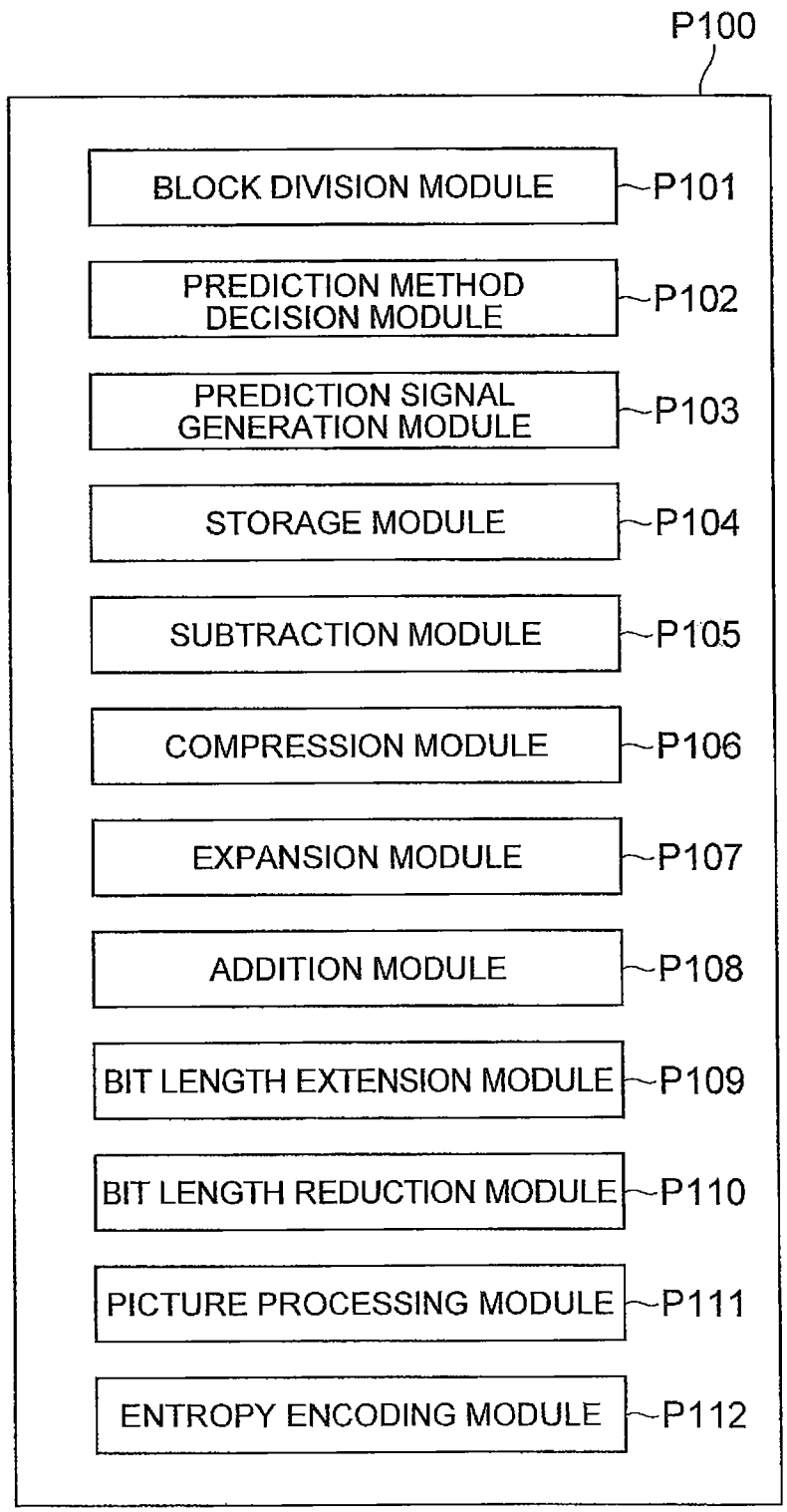
FIG. 8 is a block diagram showing modules of a moving picture encoding program according to an embodiment of the present invention.

FIG. 8 is a block diagram showing modules of a program capable of executing a moving picture encoding method. A moving picture encoding program P100 includes a block division module P101, a prediction method decision module P102, a prediction signal generation module P103, a storage module P104, a subtraction module P105, a compression module P106, an expansion module P107, an addition module P108, a bit length extension module P109, a bit length reduction module P110, a picture processing module P111, and an entropy encoding module P112.

The functions realized by execution of the respective modules described above are the functions of the moving picture encoding apparatus 100 described above. That is, the functions of the respective modules of the picture prediction encoding program P100 are the functions of the block divider 103, the prediction method decision device 106, the prediction signal generator 105, the frame memory 114, the differentiator 104, the compressor 110, the expander 111, the adder 112, the bit length extension converter 102, the bit length reduction converter 113, the picture processor 116, and the entropy encoder 115.

Figure 9:
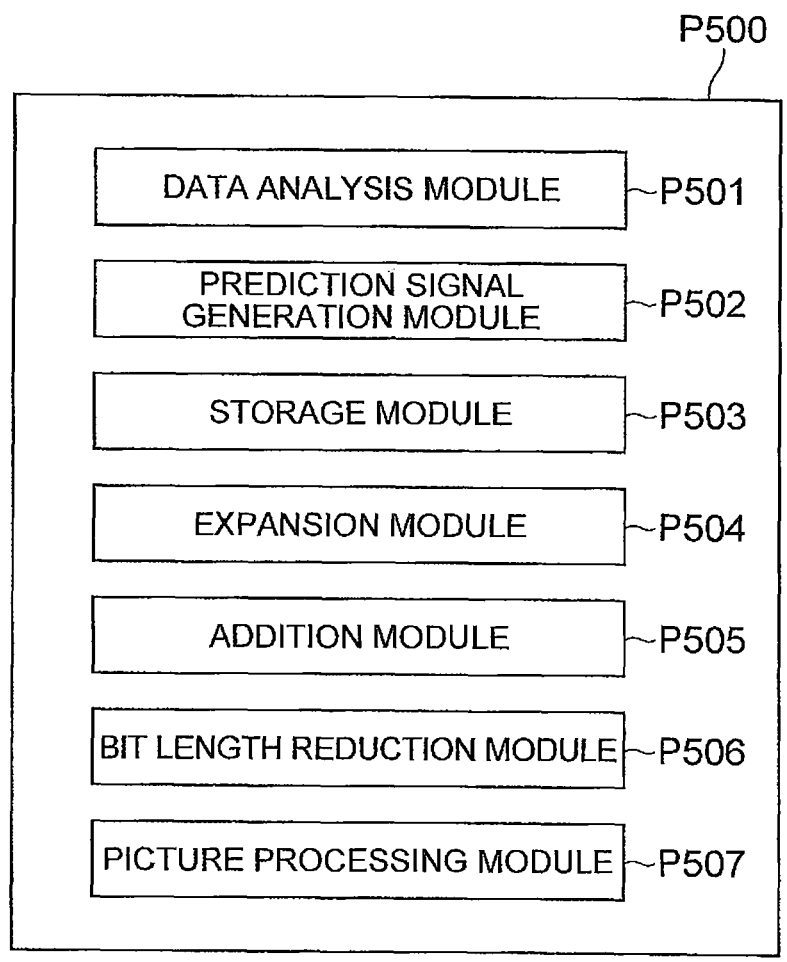
FIG. 9 is a block diagram showing modules of a moving picture decoding program according to an embodiment of the present invention.

In addition, FIG. 9 is a block diagram showing modules of a program capable of executing a moving picture decoding method. A moving picture decoding program P500 includes a data analysis module P501, a prediction signal generation module 502, a storage module 503, an expansion module P504, an addition module P505, a bit length reduction module P506, and a picture processing module P507.

The functions realized by execution of the respective modules described above are the respective constituent components of the moving picture decoding apparatus 500 described above. That is, the functions of the respective modules of the moving picture decoding program P500 are the functions of the data analyzer 502, the prediction signal generator 505, the frame memory 508, the expander 503, the adder 504, the bit length reduction converter 506, and the picture processor 507.

The moving picture encoding program P100 or the moving picture decoding program P500 configured in this way is stored in the recording medium 10 and executed by a computer will be described later.

Figure 10:
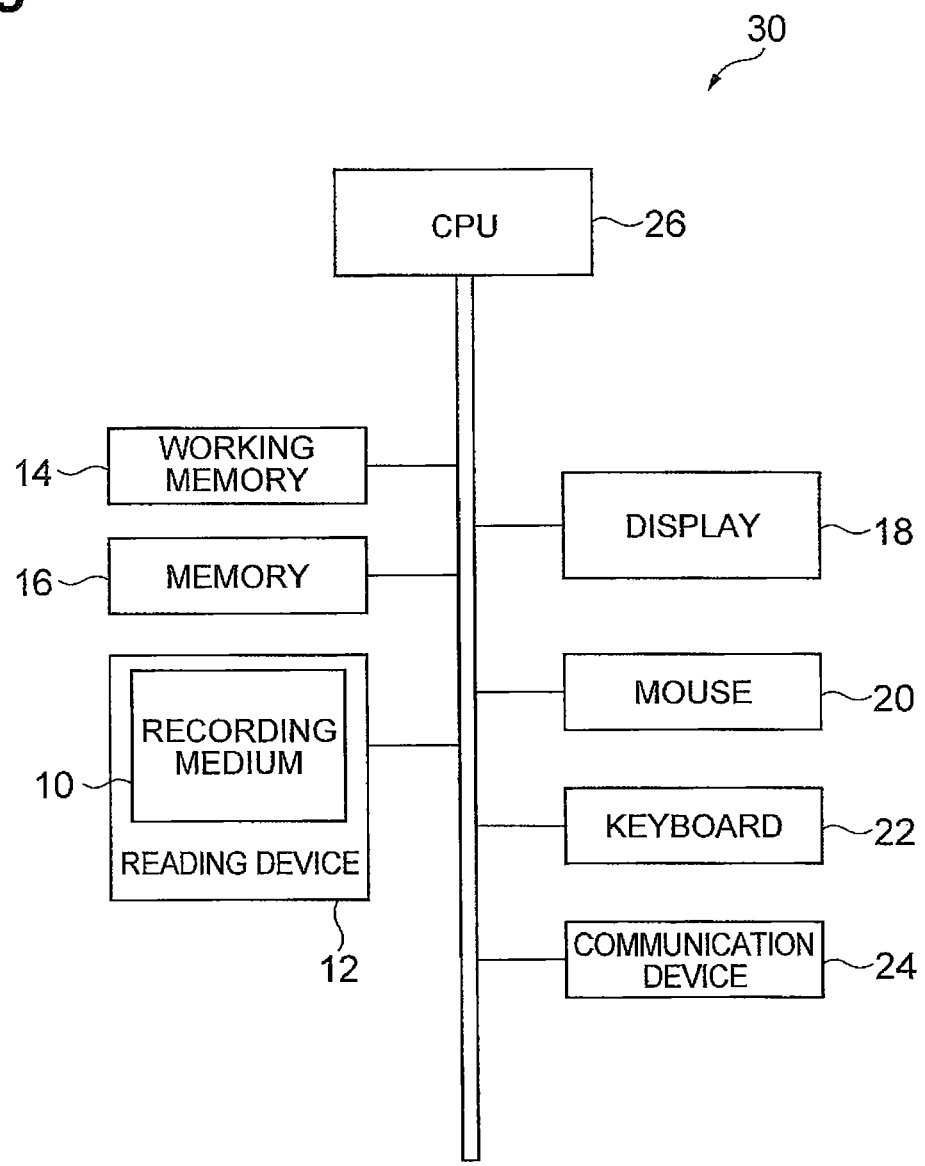
FIG. 10 is a view showing the hardware configuration of a computer for executing a program recorded on a recording medium.
Figure 11:
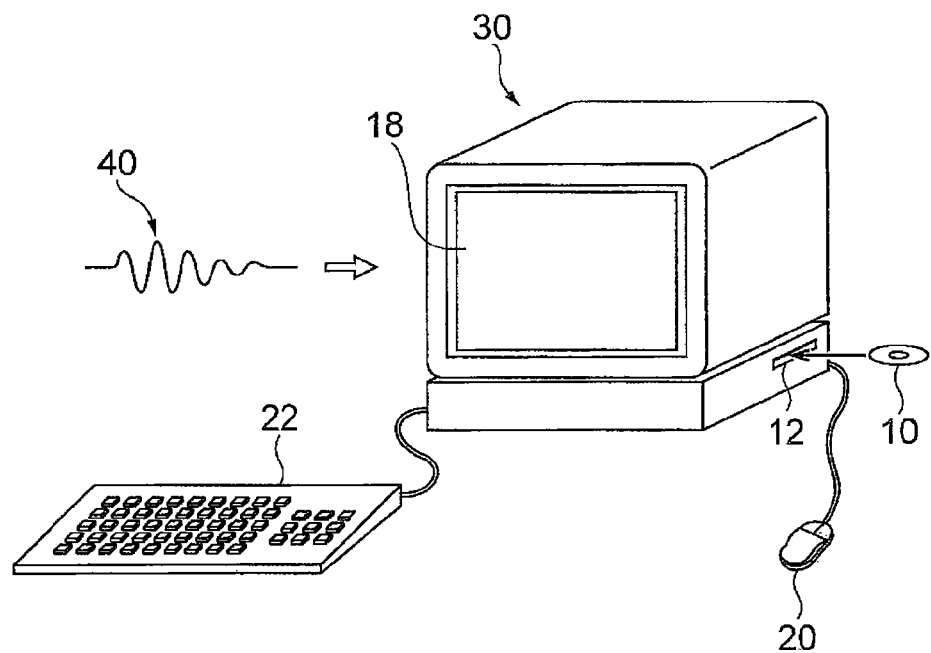
FIG. 11 is a perspective view of a computer for executing a program recorded on a recording medium.

FIG. 10 is a view showing the hardware configuration of a computer 30 for executing a program recorded on the recording medium 10, and FIG. 11 is a perspective view of the computer 30 for executing the program recorded on the recording medium 10. As the computer 30 herein, a DVD player, a set-top box, a mobile phone, and the like which include a CPU and perform processing or control by software are included.

As shown in FIG. 10, the computer 30 includes a reading device 12, such as a flexible disk drive device, a CD-ROM drive device, and a DVD drive device, an operating system-resident working memory (RAM) 14, a memory 16 which stores a program stored in the recording medium 10, a display 18, a mouse 20 and a keyboard 22 which are input devices, a communication device 24 for transmission and reception of data and the like, and a CPU 26 which controls the execution of a program. When the recording medium 10 is inserted into the reading device 12, the computer 30 accesses, by the reading device 12, a moving picture encoding program and a moving picture decoding program, which are stored in the recording medium 10. By the operation of the moving picture encoding program, the computer 30 operates as the moving picture encoding apparatus according to the present invention. By the operation of the moving picture decoding program, the computer 30 operates as the moving picture decoding apparatus related to the present invention.

As shown in FIG. 11, a moving picture encoding program and a moving picture decoding program may also be provided via a wireline network or a radio network as a computer data signal 40 superimposed on a carrier medium. In this case, the computer 30 stores, in the memory 16, a moving picture encoding program and a moving picture decoding program received by the communication device 24 and executes the moving picture encoding program and the moving picture decoding program.

According to the moving picture encoding apparatuses 100 and 100-2 of the present embodiment described above, a target picture whose pixel value is expressed as a bit length N is converted so that each pixel value is expressed as a bit length M by the bit length extension converter 102 and is then encoded by the compressor 110. In addition, the encoded picture is restored by the expander 111 and is then converted by the bit length reduction converter 113 into a reproduction picture, the pixel value of which is expressed as a bit length L of a value smaller than the bit length M, and this reproduction picture is stored in the frame memory 114 as a reference picture. Accordingly, since encoding processing is performed in the compressor 110 after each pixel of an encoding target picture signal is converted into a bit length longer than the bit length of the target signal, high-precision operations of the encoding processing become possible and the encoding efficiency can be improved. Moreover, since it is stored in the frame memory 114 after converted into the bit length L shorter than the bit length M when the encoding processing was performed in the compressor 110, an increase in the size or memory band of a frame memory can be avoided.

In addition, according to the moving picture decoding apparatuses 500, 500-2, and 500-3 of the present embodiment, an extended reproduction picture whose pixel value is expressed in a bit length M larger than the bit length N of the target picture is restored by the data analyzer 502 from a data stream input through the input terminal 501 and the expander 503, the extended reproduction picture is converted into a reproduction picture whose pixel value is expressed in a bit length L of a value smaller than the bit length M by the bit length reduction converter 506, and this reproduction picture is stored in the frame memory 508 as a reference picture. Accordingly, since decoding processing is performed in the data analyzer 502 and the expander 503 after each pixel of an encoding target picture signal is converted into a bit length longer than the bit length of the target signal, high-precision operations of the decoding processing become possible and the encoding efficiency can be achieved. Moreover, since it is stored in the frame memory 508 after converted into a bit length shorter than the bit length when performing the decoding processing in the data analyzer 502 and the expander 503, an increase in the size or memory band of the frame memory 508 can be avoided.

In addition, according to the moving picture encoding apparatuses 100 and 100-2 and the moving picture decoding apparatuses 500, 500-2, and 500-3 of the present embodiment, both the bit length of a reference picture stored in the frame memories 114 and 508 and the bit length of the reproduction picture converted by the bit length reduction converters 113 and 506 are the bit length L. For this reason, even in the case where the picture processors 116 and 507 process a reproduction picture using a reference picture, it is not necessary to additionally add a process for eliminating the bit length difference between the reference picture and the reproduction picture. Accordingly, it becomes possible to reduce the realizing and processing costs for adding new processing, such as picture processing, are reduced and improve the adaptability.

Thus, according to the present embodiment, encoding/decoding processing is performed after converting each pixel of an encoding target picture signal into the bit length longer than the bit length of the target signal, without increasing the size of the frame memory. Therefore, high-precision operations of encoding/decoding processing become possible without increasing a memory band into a frame memory, resulting in improving the encoding efficiency. In addition, processing on a picture signal using a signal stored in a frame memory is performed by the picture processors 116 and 507 after converting a reproduction signal with a long bit length into a signal with a short bit length. Therefore, the above processing can be executed without adding the bit length conversion of the signal stored in the frame memory.

Reference Signs List 100, 100-2: moving picture encoding apparatus; 101, 501: input terminal (input unit); 102, 105b, 505b: bit length extension converter (extension conversion unit); 103: block divider; 104: differentiator (residual signal generating unit); 105, 105a, 505, 505a: prediction signal generator (prediction signal generating unit); 106, 106-2: prediction method decision device (prediction signal generating unit); 110: compressor (encoding unit); 111: expander (restoration unit); 112: adder (restoration unit); 113: bit length reduction converter (reduction conversion unit); 114, 508: frame memory (storage unit); 115: entropy encoder; 116, 507: picture processor (picture processing unit); 117, 509: output terminal; 500, 500-2, 500-3: moving picture decoding apparatus; 502: data analyzer (analysis unit); 503: expander (residual signal restoration unit); 504: adder (picture restoration unit); 506: bit length reduction converter (first reduction conversion unit); 510: bit length reduction converter (second reduction conversion unit).

The invention claimed is:

1. A moving picture encoding apparatus comprising:
   an input unit configured to receive a picture to be encoded whose pixels have a first bit length;
   an extension conversion unit configured to convert the picture to be encoded into an extended picture whose pixels have a second bit length which is longer than the first bit length;
   a reduction conversion unit configured to convert a restored extended picture having the second bit length, which is generated by adding a residual signal and an extended prediction signal, into a reduced extended picture having a third bit length which is shorter than the second bit length;
   a storage unit that stores the reduced extended picture having the third bit length;
   a prediction signal generating unit configured to perform two alternative prediction modes to (i) generate the prediction signal having the second bit length and (ii) generate the prediction signal having a fourth bit length which is different from either the second or third bit length, using, as a reference picture, the reduced extended picture stored in the storage unit, and, if the generated prediction signal has the fourth bit length, convert the generated prediction signal having the fourth bit length into the extended prediction signal having the second bit length, which is subtracted from the extended picture to generate the residual signal.

2. The moving picture encoding apparatus according to claim 1, further comprising
   a picture processing unit configured to process the reduced extended picture from the reduction conversion unit before it is stored in the storage unit, using at least some of the reduced extended pictures already stored in the storage unit.

3. The moving picture encoding apparatus according to claim 2, wherein the third bit length is not equal to the first bit length.

4. The moving picture encoding apparatus according to claim 1, wherein at least one of the first, second, and third bit lengths is encoded.

5. A moving picture decoding apparatus comprising:
   an input unit configured to receive a data stream including a residual signal;
   a first reduction conversion unit configured to convert a decoded picture having a second bit length into a first reduced decoded picture having a third bit length which is shorter than the second bit length;
   a storage unit that stores the first reduced decoded picture having the third bit length;
   a prediction signal generating unit configured to perform two alternative prediction modes to (i) generate a prediction signal having the second bit length and (ii) generate a prediction signal having a fourth bit length which is different from either the second or third bit length, using, as a reference picture, the first reduced decoded picture stored in the storage unit, and, if the generated prediction signal has the fourth bit length, convert the generated prediction signal having the fourth bit length into an extended prediction signal having the second bit length, which is added with the residual signal to generate the decoded picture; and
   a second reduction conversion unit configured to convert the decoded picture having the second bit length into a second reduced decoded picture for display having a first bit length, which is shorter than the second bit length and different from the fourth bit length.

6. The moving picture decoding apparatus according to claim 5, further comprising
   a picture processing unit configured to process the first reduced decoded picture from the first reduction conversion unit before it is stored in the storage unit, using at least some of the first reduced decoded pictures already stored in the storage unit.

7. The moving picture decoding apparatus according to claim 6, wherein the third bit length is not equal to the first bit length.

8. The moving picture encoding apparatus according to claim 5, wherein at least one of the first, second, and third bit lengths is included in the data stream.

9. A moving picture encoding method comprising:
   receiving a picture to be encoded whose pixels have a first bit length;
   converting the picture to be encoded into an extended picture having a second bit length which is longer than the first bit length;
   performing two alternative prediction modes by a prediction signal generating unit to (i) generate a prediction signal having the second bit length and (ii) generate the prediction signal having fourth bit length which is different from either the second or third bit length, using, as a reference picture, the reduced extended picture stored in the storage unit; and
   if the generated prediction signal has the fourth bit length, converting, by the prediction signal generating unit, the generated prediction signal having the fourth bit length into the extended prediction signal having the second bit length, which is subtracted from the extended picture to generate the residual signal.

10. The moving picture encoding method according to claim 9, further comprising
    processing the reduced extended picture before it is stored in the storage unit, using at least some of the reduced extended pictures already stored in the storage unit.

11. A moving picture decoding method comprising:
    receiving a data stream including a residual signal;
    converting a decoded picture having a second bit length into a first reduced decoded picture having a third bit length which is shorter than the second bit length;
    storing the first reduced decoded picture having the third bit length in a storage unit;
    performing two alterative prediction modes, by a prediction signal generating unit, to (i) generate a prediction signal having the second bit length and (ii) generate a prediction signal having a fourth bit length which is different from either the second or third bit length, using, as a reference picture, the first reduced decoded picture stored in the storage unit;

if the generated prediction signal has the fourth bit length, converting, by the prediction signal generating unit, the prediction signal having the fourth bit length into an extended prediction signal having the second bit length, which is added with the residual signal to generate the decoded picture; and converting the decoded picture having the second bit length into a second reduced decoded picture for display having a first bit length which is shorter than the second bit length and different from the fourth bit length.

12. The moving picture decoding method according to claim 11, further comprising processing the first reduced decoded picture before it is stored in the storage unit, using at least some of the first reduced decoded pictures already stored in the storage unit.

13. A non-transitory storage medium which stores a moving picture encoding program executable by a computer to function as:

an input unit for receiving a picture to be encoded whose pixels have a first bit length;

an extension conversion unit for converting the picture to be encoded into an extended picture having a second bit length which is longer than the first bit length;

a reduction conversion unit for converting a restored extended picture having the second bit length, which is generated by adding a residual signal and an extended prediction signal, into a reduced extended picture having a third bit length which is shorter than the second bit length;

a storage unit for storing the reduced extended picture having the third bit length; and a prediction signal generating unit for performing two alternative prediction modes to (i) generate a prediction signal having the second bit length and (ii) generate the prediction signal having a fourth bit length which is different from either the second or third bit length, using, as a reference picture, the reduced extended picture stored in the storage unit and if the generated prediction signal has the fourth bit length, converting the generated prediction signal having the fourth bit length into the extended prediction signal having the second bit length, which is subtracted from the extended picture to generate the residual signal.

14. The storage medium according to claim 13, further comprising a program executable by the computer to function as a picture processing unit for processing the reduced extended picture before it is stored in the storage unit, using at least some of the reduced extended pictures already stored in the storage unit.

15. A non-transitory storage medium that stores a moving picture decoding program executable by a computer to function as:

an input unit for receiving a data stream including a residual signal;

a first reduction conversion unit for converting a decoded picture having a second bit length into a first reduced decoded picture having a third bit length which is shorter than the second bit length;

a storage unit for storing the first reduced decoded picture having the third bit length;

a prediction signal generating unit for performing two alternative prediction modes to (i) generate a prediction signal having the second bit length and (ii) generate a prediction signal having a fourth bit length which is different from either the second or fourth bit length, using, as a reference picture, the first reduced decoded picture stored in the storage unit, and if the generated prediction signal has the fourth bit length, converting the prediction signal having the fourth bit length into an extended prediction signal having the second bit length, which is added with the residual signal to generate the decoded picture; and a second reduction conversion unit for converting the decoded picture having the second bit length into a second reduced decoded picture for display having a first bit length which is shorter than the second bit length and different from the fourth bit length.

16. The storage medium according to claim 15, further comprising a program executable by the computer to process the first reduced decoded picture before it is stored in the storage unit, using at least some of the first reduced decoded pictures already stored in the storage unit.

17. The moving picture encoding apparatus according to claim 1, further comprising a prediction method decision device configured to select a bit length of the prediction signal between the second bit length and a fourth bit length, wherein the prediction signal generating unit generates the prediction signal having one of the second and fourth bit length selected by the prediction method decision device.

18. The moving picture encoding method according to claim 9, further comprising selecting a bit length of the prediction signal between the second bit length and the fourth bit length, wherein performing two alternative prediction modes by a prediction signal generating unit comprises generating, by the prediction signal generating unit, the prediction signal having a selected one of the second and fourth bit length.

19. The storage medium according to claim 13, further comprising a program executable by the computer to function as a prediction method decision device for selecting a bit length of the prediction signal between the second bit length and the fourth bit length, wherein the prediction signal generating unit generates a prediction signal having one of the second and fourth bit lengths selected by the prediction method decision device.

* * * * *